United States Patent [19]

Ohama et al.

[11] Patent Number: 4,861,157
[45] Date of Patent: Aug. 29, 1989

[54] APPARATUS FOR CONTINUOUSLY PHOTOGRAPHING ROAD SURFACE

[75] Inventors: Masanori Ohama, Machida; Koroku Soma, Hachioji, both of Japan

[73] Assignee: Pasco Corporation, Tokyo, Japan

[21] Appl. No.: 58,223

[22] PCT Filed: Dec. 10, 1985

[86] PCT No.: PCT/JP85/00681

§ 371 Date: Apr. 24, 1987

§ 102(e) Date: Apr. 24, 1987

[51] Int. Cl.$^4$ ............................................... G03B 29/00
[52] U.S. Cl. ................................. 352/132; 346/107 R; 354/63; 354/66
[58] Field of Search .................... 352/132; 354/63, 66; 346/107 R

[56] References Cited

U.S. PATENT DOCUMENTS

| | | | |
|---|---|---|---|
| 2,599,517 | 6/1952 | Raspet | 354/66 |
| 3,143,049 | 8/1964 | Tholey | 352/132 |
| 3,176,308 | 3/1965 | Jensen | 346/107 R |
| 3,687,035 | 8/1972 | Morgan et al. | 354/66 |
| 4,052,712 | 10/1977 | Ohama et al. | 346/107 R |
| 4,490,028 | 12/1984 | Kucher | 354/66 |

FOREIGN PATENT DOCUMENTS

| | | |
|---|---|---|
| 44-25737 | 10/1969 | Japan. |
| 25737 | 10/1969 | Japan .................. 352/132 |
| 23815 | 3/1975 | Japan .................. 352/132 |
| 116728 | 7/1984 | Japan .................. 352/132 |
| 219733 | 12/1984 | Japan .................. 352/132 |

Primary Examiner—Monroe H. Hayes
Attorney, Agent, or Firm—Armstrong, Nikaido, Marmelstein, Kubovcik & Murray

[57] ABSTRACT

This invention relates to an apparatus for continuously photographing a road surface. The apparatus has a motion picture camera attached to an outside upper part of a vehicle body, a road surfacial light projector for projecting a beam of light onto a road surface to be photographed by the motion picture camera, and a vehicle speed detector so that an iris and a film feed speed of the motion picture camera may be controlled according to an output of the vehicle speed detector. According to such an arrangement, it has such advantages that a large-sized, expensive and large control apparatus is not required and also a lifetime of a lamp of the light projector is elongated.

2 Claims, 1 Drawing Sheet

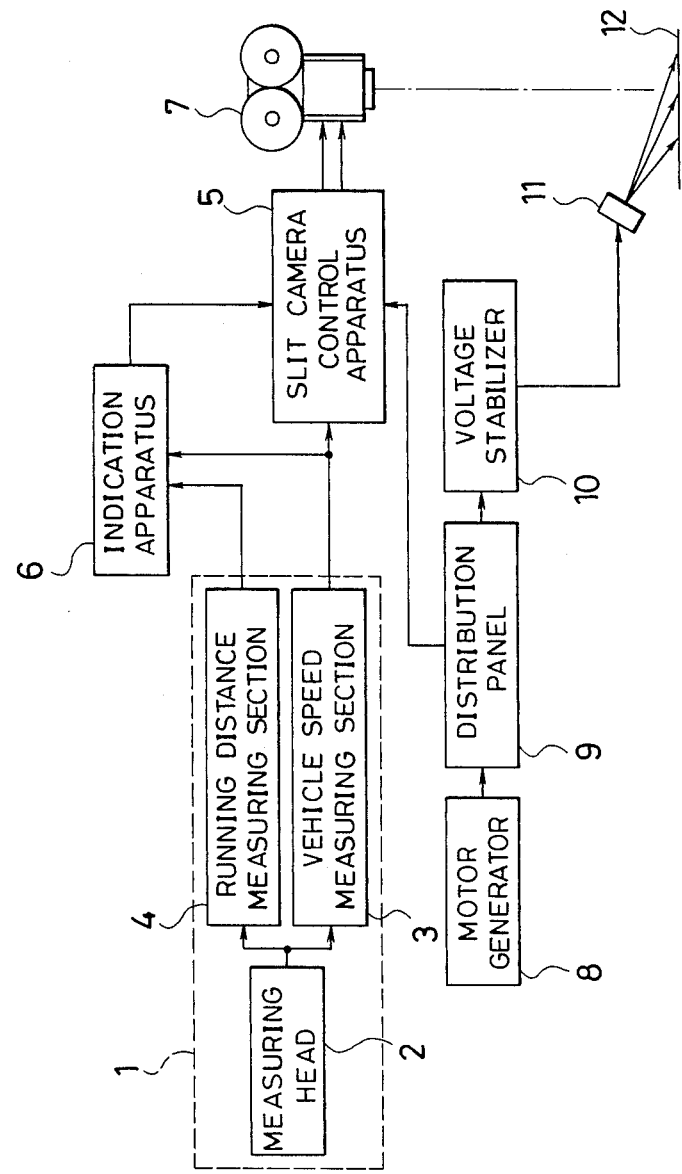

APPARATUS FOR CONTINUOUSLY PHOTOGRAPHING ROAD SURFACE

TECHNICAL FIELD

This invention relates to an apparatus for continuously photographing a road surface, and particularly to an apparatus for continuously photographing a road surface for controlling an iris and a film feeding speed of a motion picture camera thereof according to a vehicle speed.

BACKGROUND ART

A paved surface is always subjected to external actions of traffic loads, weather conditions or the like and also due to aged deterioration (obsolescence) and others, and consequently a service use property thereof would be lowered, if it is left as it is. Accordingly, if the maintenance and administration thereof are not sufficient, it is difficult to ensure smooth and safe traffic or transportation. Therefore, it is necessary to carry out proper maintenance and administration.

For observation of the road condition, there was a method for utilizing a road surface photography taken by a hand held camera, but it was inefficient and unpractical.

For this reason, the applicants of the present application have invented an apparatus for continuously photographing a road surface (Japanese Patent Publication Sho No. 44-25737 publication) and thereby the foregoing problem of the conventional example has been solved.

However, this road surfacial continuous photographing apparatus is so arranged that a film feed speed may be controlled by a synchro transmitter which is operable in conjunction with a vehicle axle and in addition a light intensity of a road surface light projector may be controlled by a generator which is operable in conjunction with the vehicle axle, and consequently there have been involved the following problems. Namely, since the light intensity control of the light projector is carried out according to a vehicle speed, a large-sized and large electric power control apparatus is required, and thereby there has been raised beside such a problem that the apparatus itself is very expensive, such a problem that the same occupies a space in the interior of a narrow room of a vehicle, and also there has been raised such a problem that because of the complicated apparatus the frequency of maintenance and inspection thereof becomes high.

In addition, since the light intensity of the light projector is controlled according to the vehicle speed, there has been raised such a problem that the lifetime of a lamp of the light projector is short.

Furthermore, even if the speed of the vehicle is constant, a rotation speed of the vehicle axle is varied with the number of gears and gear ratios of a driving apparatus or, in addition, kinds of tires and air pressures of the tires, etc., so that there has been brought about such a problem that on loading the road surfacial continuous photographing apparatus on the vehicle adjusting of the apparatus or changing in a design of the apparatus becomes necessary for each vehicle.

Accordingly, a purpose of this invention is to provide an apparatus for continuously photographing a road surface which is free from the problems of the foregoing conventional example by controlling an iris and a film feed speed of a motion picture camera according to a vehicle speed, and thereby making constant a light intensity from a light projector.

Another purpose of this invention is to provide an apparatus for continuously photographing a road surface which is free from the problems of the foregoing conventional example by obtaining a vehicle speed from a non-contact type optical sensor.

DISCLOSURE OF INVENTION

This invention is characterized in that there is provided a motion picture camera attached to an outside upper part of a vehicle body, a road surfacial light projector for projecting a light onto a road surface to be photographed by the motion picture camera, and a vehicle speed detector so that an iris and a film feed speed of the foregoing motion picture camera may be controlled according to an output of the vehicle speed detector. According to this arrangement, a large-sized expensive and large electric power controlling apparatus is not required and also a lifetime of a lamp of the light projector is elongated.

In addition, this invention is characterized in that the improved vehicle speed detector as mentioned above is a non-contact type optical sensor type. According this arrangement, changes in design or adjustment, etc. of the apparatus is unnecessary for each vehicle on which the motion picture camera is mounted.

BRIEF DESCRIPTION OF DRAWINGS

The drawing is a block diagram of an apparatus for continuously photographing a road surface according to this invention.

BEST MODE FOR CARRYING OUT THE INVENTION

A preferable embodying example of this invention will be explained with reference of the accompanying drawing as follows:

The accompanying drawing is a block diagram for explaining this invention. 1 is a vehicle speed detector of a non-contact type (an optical sensor capable of measuring a running distance also) used for this invention, and, for instance, there may be used "LEITZ CORREVIT" (trade name) manufactured Erunst Leitz Wetzlar GmbH of West Germany. The LEITZ CORREVIT is available from Shibel Kikai Kabushiki Kaisha ("Shin Kokusai Bldg." 3-4-1, Marunouchi, Chiyoda-ku, Tokyo) who is a sole agent of Japan. The vehicle speed detector 1 comprises a measuring head 2, a vehicle speed measuring section S and a running distance measuring section 4. The measuring head 2 is attached to the outside of a vehicle body. The measuring head 2 has a prism, a lattice including equally spaced lines and gaps therebetween, and a photocell, etc., and outputs a pulse signal having a frequency in proportion to a vehicle speed, and applies this pulse signal to the vehicle speed measuring section 3 and the running distance measuring section 4. The vehicle speed measuring section S and the running distance measuring section 4 are caused to output a vehicle speed signal and a running distance speed respectively on the basis of a clock signal and the pulse signal from the measuring head 2. The output of the vehicle speed measuring section S is applied to a slit camera control apparatus 5 and indication apparatus 6. The output signal of the running distance measuring section 4 is applied to the indication apparatus 6. The indication apparatus 6 is such that a running distance and a vehicle speed is indicated on a proper displaying device (,for instance, a digital displaying device) on the basis of the applied signal, and the running distance indication signal is applied to the slit camera control apparatus 5. The slit camera control apparatus 5 so operates that an iris and a film feed speed of the slit camera 7 may be controlled according to the vehicle speed signal from the vehicle speed measuring section 3 and that the running distance is photographed on each frame of a film according to the running distance indication signal from the indication apparatus 6 for convenience of the future data processing (Further, it is possible to take a photograph of not only the running distance but also the running speed, etc., but explanation thereof is omitted because this does not have a direct relation with this invention). The slit camera 7 is attached to an outside upper part (usually, a front part of the vehicle body) of the vehicle body. 8 is a motor generator (, for instance, A.C. 22OV, 50 Hz, 8.9 K V A), an electric power from the generator is applied through a distribution panel 9 to a voltage stabilizer 10 and the slit camera control apparatus or the like. The voltage stabilizer 10 is one for keeping a predetermined value constant so that an electric voltage to be applied to the light projector 11 may be kept constant. Consequently, the light projector 11 is to light a road surface 12 with a light of predetermined light intensity thereof. In a case where the slit camera 7 is attached to the front part of the vehicle body, the light projector 1 is naturally attached also to the front part of the vehicle body.

INDUSTRIAL APPLICABILITY

According to this invention, there are such advantages that a large power control apparatus which is large-sized and expensive is not required and in addition a lifetime of a lamp of a light projector is elongated, and a road surface can be photographed continuously efficiently and safety.

We claim:

1. An apparatus for continuously photographing a road surface:
    a motion picture camera attached to an outside upper part of a vehicle body;
    a road surface light projector projecting a light on to a road surface to be photographed by the motion picture camera; and
    a vehicle speed detector having an output, said vehicle speed detector being a non-contact type of optical sensor, wherein an iris and a film feed speed of the motion picture camera is controlled according to the output of the vehicle speed detector.

2. An apparatus for continuously photographic a road surface comprising:
    a motion picture camera attached to an outside upper part of a vehicle body;
    a road surface light projector projecting a light onto a road surface to be photographed by the motion picture camera; and
    a vehicle speed detector having an output, said vehicle speed detector being a non-contact optical sensor, said output of said vehicle speed detector controlling an iris and a film speed of said motion picture camera wherein a luminesce intensity of said light projected onto said road surface is maintained at a constant level regardless of vehicle speed.

* * * * *